July 31, 1928. 1,678,988
C. MAIER
FLOWERPOT HOLDER
Filed Jan. 21, 1927
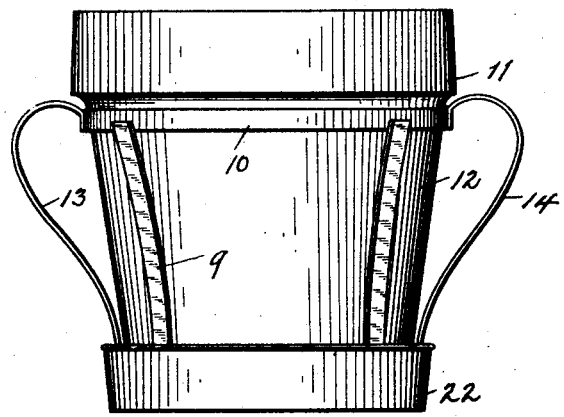
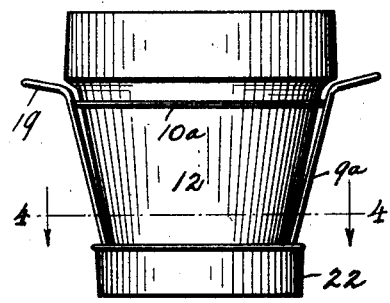
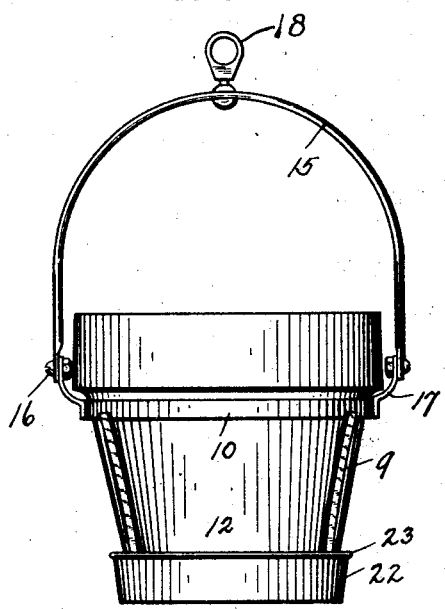
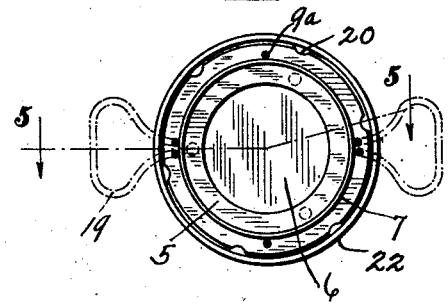
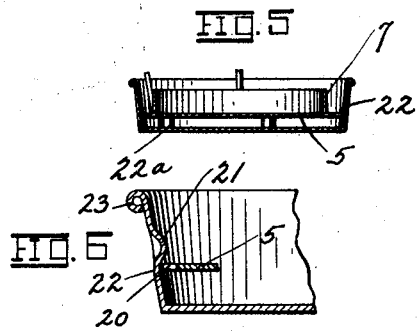
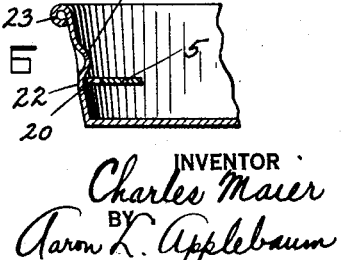
INVENTOR
Charles Maier
BY
Aaron L. Applebaum
his ATTORNEY Patented July 31, 1928.

1,678,988

UNITED STATES PATENT OFFICE.

CHARLES MAIER, OF NEW YORK, N. Y.

FLOWERPOT HOLDER.

Application filed January 21, 1927. Serial No. 162,449.

This invention relates to flower pot holders and the like and more particularly to a novel and improved receptacle or carrier designed primarily to receive a conventional flower pot and which permits of drainage without overflowing and damage to the location or object on which the receptacle or carrier is positioned.

One of the objects of my invention is to provide a flower pot holder or carrier having an open bottom and a removable or detachable water receptacle for receiving the excess drainage or which constitutes a receptacle for a quantity of water to be absorbed by the plant and earth within the flower pot.

A continued object of my invention is to provide a portable flower pot holder or carrier constructed and arranged to receive a conventional type of clay or fragile flower pot having an open bottom and spaced from a detachably connected water receptacle or container for receiving the excess drainage and which also constitutes a water supply reservoir for the plant.

To enable others skilled in the art to more fully comprehend the underlying features of my invention that they may practice the same according to my preferred embodiments herein illustrated, drawings depicting my invention are annexed hereto in which Fig. 1 is a perspective view showing the application and use of my invention in connection with a conventional type of flower pot.

Fig. 2 is a similar view of a modified form of the invention.

Fig. 3 is a view similar to Fig. 1 and showing an arbor handle.

Fig. 4 is a view taken on the line 4—4 of Fig. 2.

Fig. 5 is a view taken on the line 5—5 of Fig. 4.

Fig. 6 is a detail view in section showing the locking means between the water receptacle and the open bottom of the carrier.

Referring now to the drawings wherein like reference characters designate corresponding parts throughout the several views, 5 designates an annular bottom having a central opening 6, and 7 a bottom rim preferably integral with the annular bottom which is adapted to support a conventional type of clay or fragile flower pot 12 as shown throughout the several views of the drawing.

Connected to the bottom rim are a plurality of flat strips 9 which are bent slightly outwardly conforming to the shape of the flower pot, said strips having a narrow ring or rim 10 adapted to extend just below the top portion 11 of the said flower pot 12. The said strips and ring or rim are preferably connected as by soldering or in any other convenient and efficient manner as manufacturing necessities may require.

In the form of the invention shown by Fig. 1, curved handles 13, 14 connect the bottom rim 7 and the top ring or rim 10. In Fig. 3, I have shown the handle or support in the form of an arbor and consisting of a curved single or double wire 15 pivotally connected at 16 to brackets 17 fastened to the top ring or rim 10. An eye 18 permits the said handle to be supported from the ceiling or where desired.

In Figs. 2 and 4 I have illustrated the flower pot holder in a manner which permits of its construction by employing wire or round rods and in which the top ring or rim 10$^a$ is connected to the bottom rim by wire strips 9$^a$, certain of the strips constituting the side handles 19 whereby the flower pot holder and its flower pot may be conveniently handled.

In each form of the invention, it will be noted that the periphery of the annular bottom 5 extends outside or beyond the bottom rim and is provided with a series of radially disposed notches 20 which are adapted to cooperate with the inwardly struck beads 21 on the annular receptacle 22 so as to lock and connect the flower pot holder proper thereto. The shallow receptacle 22 is of a height to extend just about above the top of the bottom rim 7, the top edge of said receptacle having a rolled portion 23 as suggested by Fig. 6. The notches 20 therefore permit the beads 21 to register therewith so that the receptacle may be removed for the obvious purpose. In other words, the flower pot is confined and held in an open frame having an open bottom which is seated within a shallow, closed water and drainage receptacle and which is carried by said open frame when the beads 21 and the said notches are out of registration. The open bottom is therefore provided with short lugs or spacers preferably formed integral therewith and designated by numeral 22$^a$ which space the bottom of the receptacle from the open bottom of the frame permitting the excess drainage to pass through the opening in the bottom of the flower pot and also permitting the absorption of moisture into the flower pot when the said receptacle is supplied with water for the plant.

It will thus be seen that I have provided a very simple, efficient and very useful device for supporting a flower pot and which permits of the easy handling and transportation of a plant without danger. The longevity of the plant may be increased and the danger of its destruction avoided by providing means for supplying it with moisture from the detachable bottom receptacle. It will also be seen that the receptacle serves to prevent the overflow of any drainage when the plant is being watered and thus avoids damage to the surrounding objects.

While I have shown and described my invention with some degree of particularity, it will be understood by those skilled in the art that various changes in the details shown and described may be resorted to. I therefore do not wish to be limited and restricted to the exact details and forms shown but reserve the right to make such changes and alterations as may fairly fall within the scope and are commensurate with the subject matter of the claims annexed hereto.

Having shown and described my invention what I claim as new and desire to secure by Letters Patent is:

1. A flower pot holder of the class described comprising an open frame shaped to conform to the contour of a flower pot and provided with a top and bottom rim and an open bottom, said top rim supporting the flower pot, handles connected to the top and bottom rim and a removable water receptacle detachably connected to the said open bottom.

2. A flower pot holder of the class described comprising an open frame shaped to conform to the contour of a flower pot and provided with a top and bottom rim, strips connecting the rims, said frame having an open bottom and notches in the periphery of said bottom, a shallow receptacle into which the frame rests in spaced relation to its bottom and beads cooperating with the notches on the periphery of the bottom for interlocking said frame with the receptacle.

3. A flower pot holder of the class described comprising an open frame shaped to conform to the contour of a flower pot and provided with a top and bottom rim, outwardly bowed strips connecting the rims, handles on the sides of the frame, said frame having an open bottom with its periphery extending outside the bottom rim, radially disposed notches in the said periphery of the bottom and a detachable shallow receptacle into which the said frame is adapted to rest in spaced relation to its bottom, the wall of said receptacle having beads for registration with the notches.

4. A flower pot holder of the class described comprising an open frame shaped to conform to the contour of a flower pot and provided with a top and bottom rim, strips connecting the rims, handles on the sides of the frame, said frame having an open bottom with its periphery extending outside the bottom rim, radially disposed notches in the said periphery of the bottom, spacing lugs on said bottom and a detachable shallow receptacle into which the bottom of the frame is adapted to rest, the wall of said receptacle having inwardly bent beads adapted to register with the said notches in one position and permit of the rotation of the frame relative to the receptacle to lock the same in a second position.

In testimony whereof I affix my signature.

CHARLES MAIER.